(12) United States Patent
Couture et al.

(10) Patent No.: US 9,593,925 B2
(45) Date of Patent: Mar. 14, 2017

(54) MEASURING JIG

(71) Applicants: Jacques Couture, Trois-Rivieres (CA); Yanick Nolet, Trois-Rivieres (CA)

(72) Inventors: Jacques Couture, Trois-Rivieres (CA); Yanick Nolet, Trois-Rivieres (CA)

( * ) Notice: Subject to any disclaimer, the term of this patent is extended or adjusted under 35 U.S.C. 154(b) by 140 days.

(21) Appl. No.: 14/704,237

(22) Filed: May 5, 2015

(65) Prior Publication Data

US 2015/0323299 A1 Nov. 12, 2015

(30) Foreign Application Priority Data

May 10, 2014 (GB) .................................. 1408379.4

(51) Int. Cl.
*G01B 3/10* (2006.01)
*G01B 3/14* (2006.01)

(52) U.S. Cl.
CPC ............. *G01B 3/14* (2013.01); *G01B 3/1084* (2013.01)

(58) Field of Classification Search
CPC ................................ G01B 3/14; G01B 3/1084
USPC ..................................................... 33/759, 760
See application file for complete search history.

(56) References Cited

U.S. PATENT DOCUMENTS

| | | | | |
|---|---|---|---|---|
| 318,464 A | | 5/1885 | Garsuch et al. | |
| 389,647 A | | 9/1888 | Hall et al. | |
| 1,374,815 A | * | 4/1921 | Breul | G01B 3/56 33/429 |
| 1,374,816 A | * | 4/1921 | Breul | G01B 3/56 33/429 |
| 1,429,765 A | * | 9/1922 | Pafford | G01B 3/56 33/419 |
| 1,691,118 A | * | 11/1928 | Lissy | G01B 3/56 33/473 |
| 1,759,541 A | | 5/1930 | Childress | |
| 2,745,447 A | | 5/1956 | Studley, Jr. | |
| 3,673,689 A | * | 7/1972 | Magnotto | B25H 7/005 33/471 |
| 4,483,071 A | * | 11/1984 | te Kolste | B23Q 1/4804 30/376 |
| 4,642,898 A | | 2/1987 | Miller | |
| 4,779,354 A | * | 10/1988 | Hill | B23D 59/002 33/403 |
| 5,271,159 A | * | 12/1993 | Chen | B23Q 9/005 33/403 |
| 5,349,758 A | | 9/1994 | Bear | |
| 5,493,789 A | * | 2/1996 | Duginske | B23D 59/002 33/202 |
| 6,226,885 B1 | | 5/2001 | Korich | |

(Continued)

*Primary Examiner* — G. Bradley Bennett

(57) ABSTRACT

A measuring jig including a body, the body defining a substantially elongated recess delimited by a recess first side surface, a recess first edge surface extending from the recess first side surface, a recess second edge surface extending from the recess first side surface, the recess first and second edge surfaces extending in a substantially laterally opposed and substantially parallel relationship relative to each other, and a recess mitered end surface extending from the recess first side surface and between the recess first and second edge surfaces, the recess mitered end surface being mitered relative to the recess first and second edge surfaces, the body further defining a tape measure mount for mounting at least part of a tape measure thereto so that a tape measure first end is substantially in register with the recess first edge surface adjacent the recess mitered end surface.

18 Claims, 3 Drawing Sheets

(56) References Cited

U.S. PATENT DOCUMENTS

| | | | |
|---|---|---|---|
| D502,117 S | 2/2005 | Johnson et al. | |
| 6,966,123 B1 | 11/2005 | Rubino | |
| 7,069,659 B1 | 7/2006 | Rye | |
| 7,181,860 B1 | 2/2007 | Umholtz | |
| 7,437,828 B1* | 10/2008 | Rozmiarek | E04F 21/0076 33/416 |
| 7,509,746 B1 | 3/2009 | Kozina et al. | |
| 7,676,950 B2 | 3/2010 | Ogilvie | |
| 2004/0040169 A1* | 3/2004 | Davis | B23D 59/002 33/640 |
| 2013/0318804 A1* | 12/2013 | Harris | G01C 9/26 33/342 |

\* cited by examiner

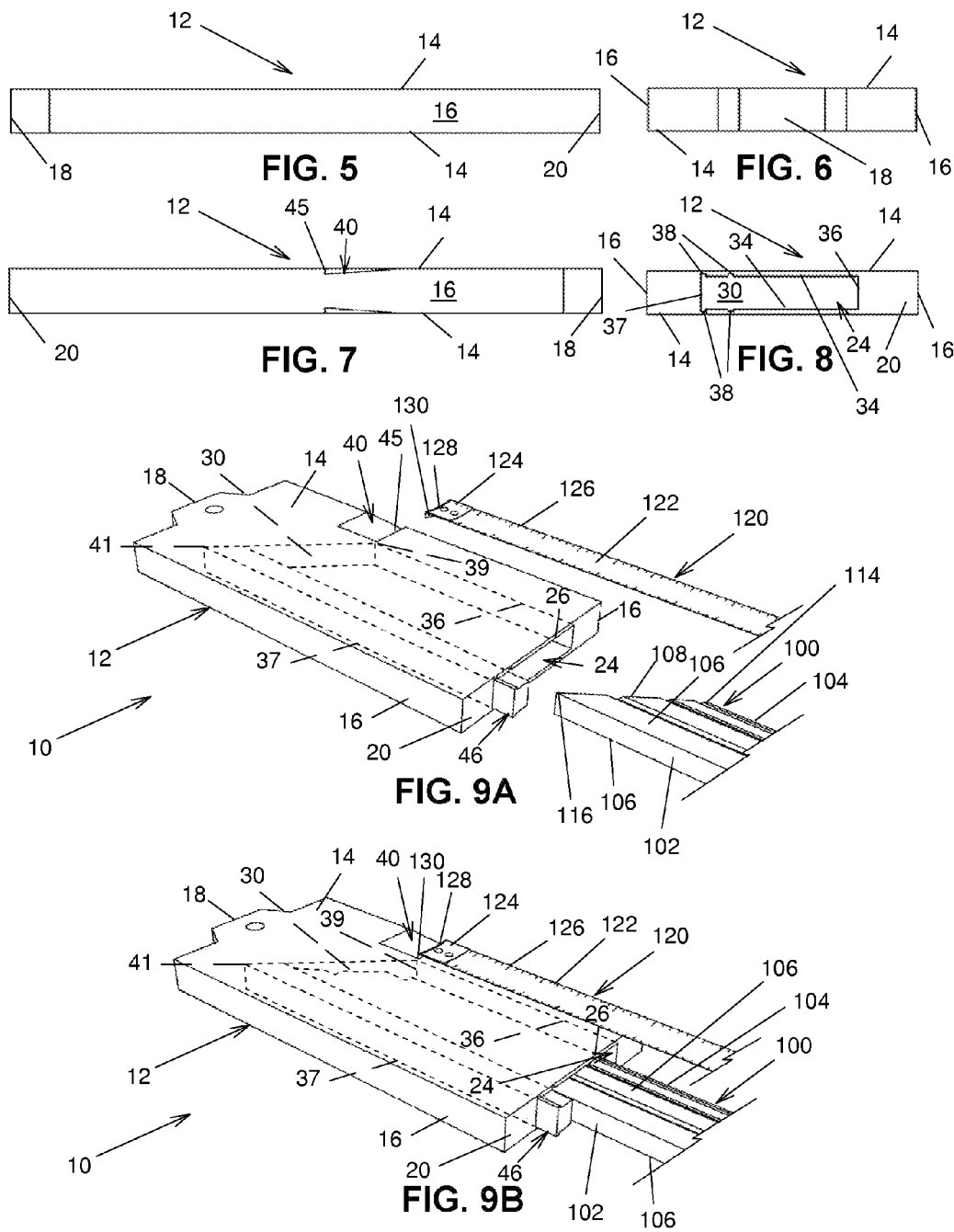

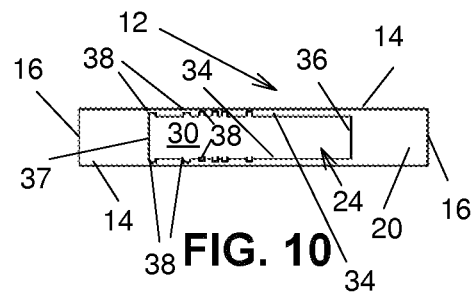
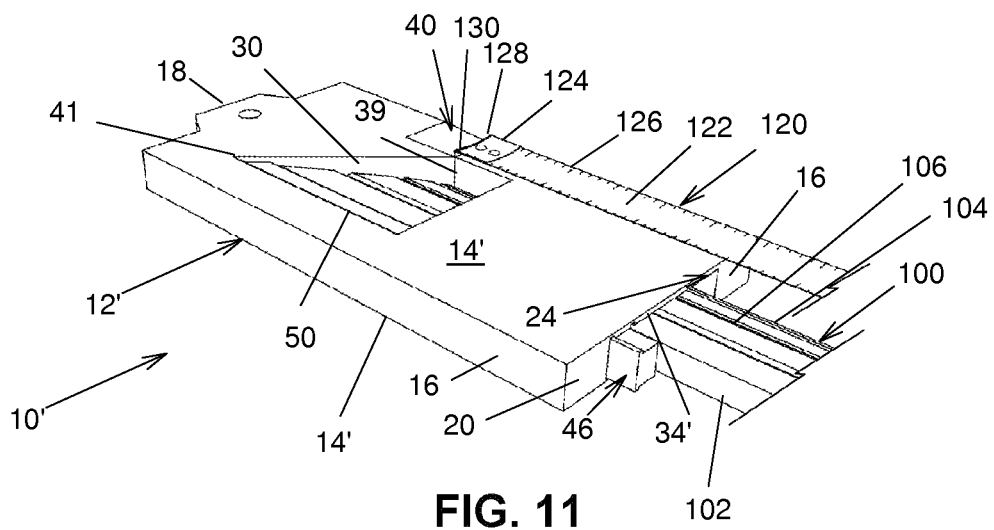
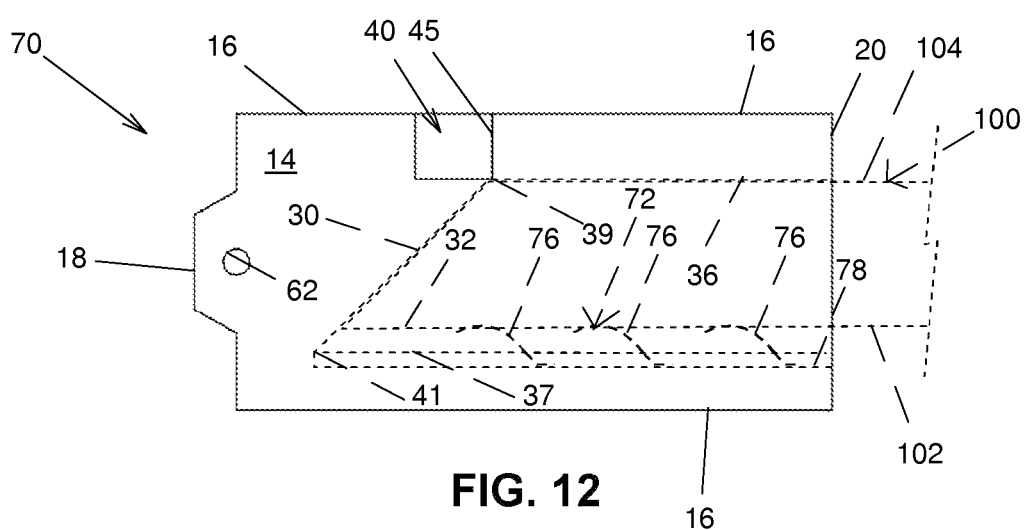

MEASURING JIG

FIELD OF THE INVENTION

The present invention relates generally to carpentry, and, more particularly, to a measuring jig usable with a tape measure to measure mitered moldings and similarly shaped objects.

BACKGROUND

Measuring jigs usable for assisting in the precise measurement of the strip inner longitudinal edge of a mitered molding strip are known. As would be obvious to someone familiar with carpentry practices, such precise measurements are required for installing molding strips, for example, typically around windows and doors.

These known measuring jigs are generally represented by a woodworking square or instrument that includes intricate shapes or assemblies of pivotable or otherwise adjustably movable components having portions thereof that are removably engageable with a mitered end portion of a mitered molding strip.

In some instances, the square or instrument generally further includes a measuring means in the form of a fixed ruler or the like, or can be usable in cooperative relation with a commercially available pocket tape measure typically incorporating a rolled up measuring tape.

While the known measuring jigs of the prior art can generally fulfill the main objective of allowing a user to measure the strip inner longitudinal edge of a mitered molding strip, they are also inefficient in executing this particular task.

These known measuring jigs generally include movable components adjustable with one or more set screws, which can inadvertently loosen-up after a few usage and end up introducing hard to detect measurement errors that can only be observed once all the molding strips have been cut to the apparently specified lengths and installed around a window or door.

In some instances of these measuring jigs, they include movable parts engaged on pivot pins which, after a year of usage or so, may also get slightly worn or misaligned and, in turn, introduce more measurement errors.

In some other instances of these measuring jigs, they involve a relatively delicate and precise procedure to be properly engaged on the mitered end portion of the molding, which is not desirable, particularly for inexperienced carpenters in training programs.

In some other instances of these measuring jigs, they are not heavy duty made and, so, can easily crack or break apart when dropped on the floor and/or walked on parts thereof.

In yet some other instances of these measuring jigs, they require the user to have one hand simultaneously holding parts of the measuring jig and the mitered molding strip while the other must singlehandedly manipulate the pocket tape measure or ruler for taking a measurement and put a marking on the molding.

In view of the above, there is a need in the industry for an improved measuring jig.

An object of the present invention is to provide such a measuring jig.

SUMMARY OF THE INVENTION

In a broad aspect, the invention provides a measuring jig for measuring a mitered molding using a tape measure defining a tape measure first end, the mitered molding defining a molding mitered end surface, the measuring jig comprising: a body, the body defining a substantially elongated recess delimited by a recess first side surface, a recess first edge surface extending from the recess first side surface, a recess second edge surface extending from the recess first side surface, the recess first and second edge surfaces extending in a substantially laterally opposed and substantially parallel relationship relative to each other, and a recess mitered end surface extending from the recess first side surface and between the recess first and second edge surfaces, the recess mitered end surface being mitered relative to the recess first and second edge surfaces, the body further defining a tape measure mount for mounting at least part of the tape measure thereto so that the tape measure first end is substantially in register with the recess first edge surface adjacent the recess mitered end surface. Inserting the mitered molding in the recess with the molding mitered end surface abutting against the recess mitered end surface allows measuring the mitered molding using the tape measure.

The invention may also provide a measuring jig wherein the recess is further delimited by a recess second side surface extending in a substantially parallel and substantially spaced apart relationship relative to the recess first side surface, the recess first edge, second edge and mitered end surfaces extending each between the recess first and second side surfaces, the body further defining an aperture leading in the recess substantially opposed to the recess mitered end surface.

The invention may also provide a measuring jig wherein the recess first edge surface is shorter than the recess second edge surface.

The invention may also provide a measuring jig wherein at least part of the body in register with one of the recess first and second side surfaces is substantially translucent.

The invention may also provide a measuring jig wherein at least part of the body in register with one of the recess first and second side surfaces is substantially transparent.

The invention may also provide a measuring jig wherein the body is provided with a window leading into the recess and delimited at least in part by one of the recess first and second side surfaces.

The invention may also provide a measuring jig further comprising a width adjustment element for selectively obstructing part of the recess so that the mitered molding is confined between the width adjustment element and the recess first edge surface when operatively inserted in the recess.

The invention may also provide a measuring jig wherein the width adjustment element is removably insertable in the recess.

The invention may also provide a measuring jig wherein the width adjustment element frictionally engages the body when the width adjustment element is operatively mounted in the recess to retain the width adjustment element in the recess.

The invention may also provide a measuring jig wherein the width adjustment element is longitudinally protruding from the recess when the width adjustment element is operatively mounted in the recess and abuts against the recess mitered end surface.

The invention may also provide a measuring jig wherein the width adjustment element defines a pair of substantially opposed width adjustment element first and second side surfaces and substantially opposed width adjustment element first and second edge surfaces extending therebetween, the width adjustment element first and second side surfaces respectively abutting against the recess first and second side surfaces when the width adjustment element is operatively inserted in the recess.

The invention may also provide a measuring jig wherein the recess first and second side surfaces define each a respective groove extending thereinto substantially longitudinally therealong laterally spaced apart from the recess first and second side surfaces, the grooves facing each other, the width adjustment element engaging both of the grooves when the width adjustment element is operatively mounted in the recess.

The invention may also provide a measuring jig wherein the width adjustment element defines a pair of substantially opposed width adjustment element first and second side surfaces, the width adjustment element first and second side surfaces facing respectively the recess first and second side surfaces when the width adjustment element is operatively inserted in the recess; the width adjustment element defines a flange protruding from each of the width adjustment element first and second side surfaces and extending substantially longitudinally along the width adjustment element; and the flanges are each inserted in a respective one of the grooves when the width adjustment element is operatively mounted in the recess.

The invention may also provide a measuring jig wherein the width adjustment element includes a biasing element for biasing the mitered molding towards the recess first edge surface when the mitered molding is operatively inserted in the recess.

The invention may also provide a measuring jig wherein the biasing element includes a leaf spring mounted at the recess second edge surface and protruding in the recess.

The invention may also provide a measuring jig wherein the recess second edge surface defines a spring receiving recess for receiving the leaf spring therein when the leaf spring is compressed against the recess first edge surface.

The invention may also provide a measuring jig wherein the tape measure mount defines a ledge extending substantially perpendicularly to the recess first side surface and substantially perpendicularly to the recess first edge surface.

The invention may also provide a measuring jig wherein the body defines a storage aperture extending therethrough.

Advantageously, the proposed measuring jig is manufacturable at relatively low cost and represents a substantially robust, yet precise measuring jig that is substantially easily manipulable.

The present application claims benefit from UK request application 1408379.4 filed May 10, 2014, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 5, in a first side elevational view, illustrates the body of FIG. 2;

FIG. 6, in a rear end elevational view, illustrates the body of FIG. 2;

FIG. 7, in a second side elevational view, illustrates the body of FIG. 2;

FIG. 8, in a front end elevational view, illustrates the body of FIG. 2;

FIG. 9A, in a perspective view, illustrate a first step of a method for measuring a mitered molding using the measuring jig of FIG. 1;

FIG. 9B, in a perspective view, illustrate a second step of the method for measuring the mitered molding using the measuring jig of FIG. 1;

FIG. 10, in a front end elevational view, illustrates the body of FIG. 2 in accordance with an alternative embodiment of the present invention;

FIG. 11, in a perspective view, illustrates an alternate embodiment of a measuring jig for measuring a mitered molding, according to the present invention; and FIG. 12, in a top elevation view, illustrates another alternate embodiment of a measuring jig for measuring a mitered molding, according to the present invention.

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 1:
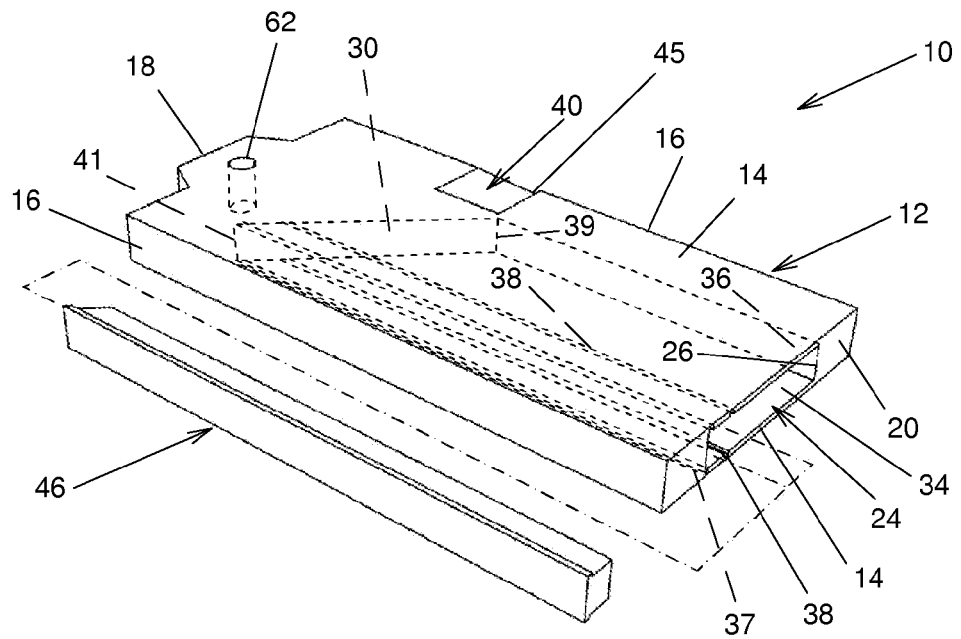
FIG. 1, in a perspective exploded view, illustrates an embodiment of a measuring jig for measuring a mitered molding, according to the present invention.

FIG. 1 illustrates a measuring jig 10, according to an embodiment of the present invention. As best illustrated in FIG. 9B, the measuring jig 10 is typically usable with a tape measure 120 (only partially shown in the drawings) for measuring a user selected length of a mitered molding 100. The tape measure 120 defines a tape measure first end 128, which typically corresponds with the origin of a measuring scale 126.

The mitered molding 100 typically defines a molding outer longitudinal edge 102, a relatively shorter molding inner longitudinal edge 104 parallelly extending relative to the molding outer longitudinal edge 102, and a molding mitered end surface 108 extending therebetween obliquely relative thereto. A molding outer pointed end corner 116 and a molding inner end corner 114 are defined at the opposed ends of the molding mitered end surface 108, respectively at the junction with the molding outer and inner longitudinal edges 104 and 102. The mitered molding 100 further defines opposed molding side wall surfaces 106, the molding inner and outer longitudinal edges 104 and 102 and the molding mitered end surface 108 extending between the molding side wall surfaces 106.

The tape measure 120, also known as a pocket tape, typically includes a tape measure body (out of view in the drawings), an elongated measuring tape 122 typically rolled-up in the tape measure body, and with the tape measure first end 128 thereof terminated with a measuring tape anchoring member 124.

Now referring to FIG. 1 for example, the measuring jig 10 comprises a body 12. The body 12 has typically a substantially rectangular box shaped configuration defining opposed body front and rear ends 20 and 18. The body 12 further defines longitudinally and parallelly extending opposed body side walls 14 and relatively narrower opposed body edge walls 16 respectively. In some embodiments, one of the body side walls 14 is omitted and the body 12 is therefore open on one side thereof. While this possibility is within the scope of the invention, only an embodiment including two body side walls 14 is described in details hereinbelow, with the understanding that this embodiment can be modified by removing one of the body side walls 14.

Figure 2:
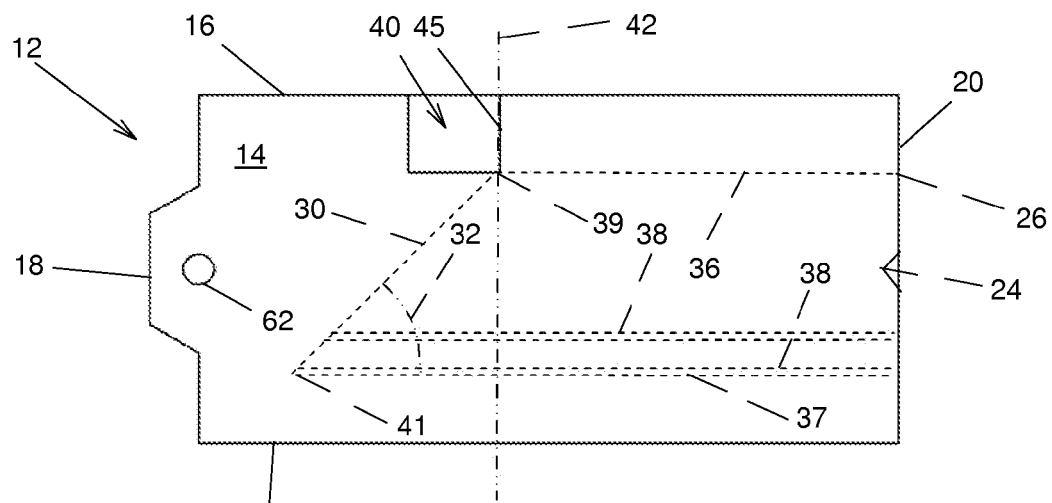
FIG. 2, in a top plan view, illustrates a body part of the measuring jig of FIG. 1.

The body 12 further defines a recess 24. The recess 24 takes the form of a bore extending in the body 12 from the body front end 20. To that effect, the body 12 typically defines a substantially rectangular-shaped aperture 26 disposed substantially centrally relative to the body front end 20. The recess 24 extends longitudinally inwardly from the aperture 26, typically along a substantial portion of the whole length of the body 12, as best illustrated in FIG. 2. The recess 24 is suitably sized and shaped to typically conform to the outer surfaces of a suitable sized molding 100 such that the latter can be longitudinally slidably received therein, in a substantially snug fit relation.

Thus, as seen for example in FIG. 8, the recess 24 is delimited by oppositely facing recess side surfaces 34 and recess first and second edge surfaces 36 and 37 that are extending substantially longitudinally and parallelly relative to the body side walls 14 and body edge walls 16 respectively, between the aperture 26 and a recess mitered end surface 30. The recess first and second edge surfaces 36 and 37 extend in a substantially laterally opposed and substantially parallel relationship relative to each other. The recess side surfaces 34 extend in a substantially parallel and substantially spaced apart relationship relative each other. The recess first edge, second edge and mitered end surfaces 36, 37 and 30 extend each between the two recess side surfaces 34.

Furthermore, the recess first edge surface 36 is relatively shorter than the recess second edge surface 37 such that the recess mitered end surface 30 extends at an end wall miter angle 32 relative to the recess second edge surface 37 that substantially conforms to the angle of the mitered end of the mitered molding 100, as best illustrated in FIG. 2, so that the recess mitered end surface 30 is mitered relative to the recess first and second edge surfaces 36 and 37.

Thus, a recess inner end corner 39 defining an angle greater than ninety (90) degrees is formed at the junction between the recess first edge surface 36 and the recess mitered end surface 30. Furthermore, a recess outer pointed end corner 41 defining an angle smaller than ninety (90) degrees is formed at the junction between the recess second edge surface 37 and the recess mitered end surface 30.

In a specific embodiment of the present invention, the miter angle 32 is forty-five (45) degrees. As would be obvious to someone familiar with customizing mitered moldings 100 for installation around windows, doors and the likes, other angle values for the miter angle 32 are also possible. For example, an octagonal window would require the miter angle 32 to have an angle value of twenty-two and a half (22.5) degrees.

In some embodiments, the measuring jig 10 further includes a width adjustment element for selectively obstructing part of the recess 24 so that the mitered molding 100 is confined between the width adjustment element and the recess first edge surface 36 when operatively inserted in the recess 24. In a specific embodiment of the invention, as seen in FIG. 1, the width adjustment element takes the form of a guide member 46 that is removably insertable in the recess 24.

Figures 3, 4:
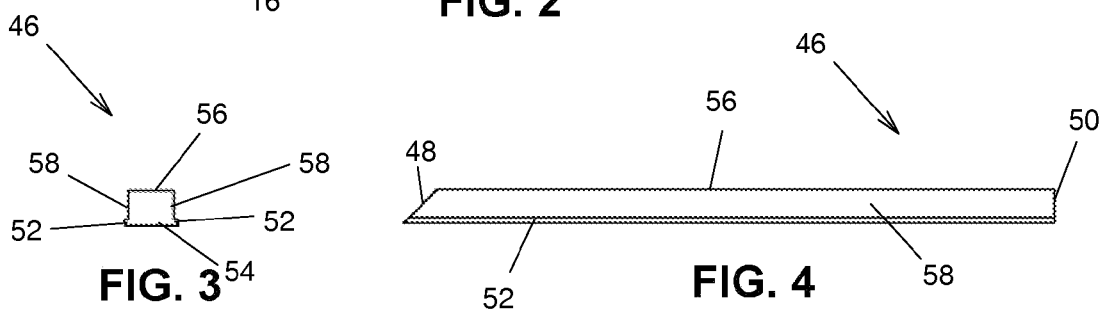
FIG. 3, in an end elevational view, illustrates a width adjustment element in the form of a guide member part of the jig of FIG. 1.
FIG. 4, in a side elevational view, illustrates the guide member of FIG. 3.

In some embodiments, the recess 24 may further define at least one pair of guide member engaging grooves 38 for longitudinally slidably receiving therein part of the guide member 46, as illustrated in FIGS. 1, 3 and 8, and which will be described further below. It should be noted that in some embodiments, the guide member engaging grooves 38 engage a differently shaped guide member 46 that is simply plate-shaped and that extends between the guide member engaging grooves 38 when operatively mounted in the recess 24.

The at least one pair of guide member engaging grooves 38 extend each into one of the recess side surfaces 34, facing each other. The at least one pair of guide member engaging grooves 38 extends from the aperture 26 at least a portion of the whole longitudinal length of the pair of recess side surfaces 34. Typically, the at least one pair of guide member engaging grooves 38 extends the whole longitudinal length of the pair of recess side surfaces 34. The guide member engaging grooves 38 are for example laterally spaced apart from the recess first and second edge surfaces 36 and 37. The width adjustment element, for example the guide member 46, engages both of the guide member engaging grooves 38 when operatively mounted in the recess 24.

In some embodiments, as exemplified in FIGS. 1, 2 and 8, a first pair of guide member engaging grooves 38 may extend along oppositely facing portions of the recess side surfaces 34 that are substantially proximally disposed relative to the junction thereof with the recess second edge surface 37.

In some other embodiments, at least one additional pair of guide member engaging grooves 38 may extend parallelly in a spaced apart relationship relative to the first pair described above. The additional pair of guide member engaging grooves 38 may be substantially adjacent the recess second edge surface 37.

Although two pairs of guide member engaging grooves 38 are illustrated along the recess side surfaces 34 in FIGS. 1, 2 and 8, it is to be understood that one, or more than two pairs of guide member engaging grooves 38 may be provided in a parallelly spaced apart relation relative to each other along the oppositely facing recess side surfaces 34.

For example, as illustrated in FIG. 11, a plurality of guide member engaging grooves 38 may be provided along the recess side surfaces 34 and at various predetermined distances from the recess first edge surface 36. This configuration allows using the measuring jig 10 with mitered moldings 100 having different dimensions.

FIGS. 3 and 4 illustrate an embodiment of the guide member 46. The guide member 46 has a substantially elongated configuration and is substantially T-shaped in cross-section. Referring to FIG. 1, the guide member 46 has a guide member first end 48 and an opposed guide member second end 50. The guide member 46 further has a guide member first edge surface 54, a guide member second edge surface 56 substantially opposed thereto, and substantially opposed guide member side surfaces 58, that are all longitudinally extending between the guide member first end 48 and opposed guide member second end 50, and between the guide member first and second edge surfaces 54 and 56, as seen in FIG. 3.

The guide member 46 further defines a pair of flanges 52 extending longitudinally and substantially perpendicularly outwardly relative to the opposed guide member side surfaces 58, and substantially adjacent the junction with the guide member first edge surface 54.

The guide member 46 has a cross-section that is suitably sized and shaped for being user selectively slidably engaged longitudinally, in a snug fit relation, along a longitudinal portion of the recess 24. The guide member 46 is longitudinally inserted therein with its pair of flanges 52 engaged into one of the at least one pair of guide member engaging grooves 38, and a longitudinal portion thereof occupying a corresponding longitudinal portion of the recess 24 between the guide member engaging grooves 38. The guide member side surfaces 58 face each a respective one the recess side surfaces 34 when the guide member 46 is operatively inserted in the recess 24.

Furthermore, the guide member 46 has typically a longitudinal length dimension that is suitably sized such that at least a sufficient portion of the guide member 46 protrudes longitudinally from the recess 24 when the guide member 46 is operatively mounted in the recess 24 and abuts against the recess mitered end surface 30. Thus, a user (not shown in the drawings) may grab the protruding portion thereof in order to insert and pull out the guide member 46 from the recess 24. It is to be understood that the guide member 46 may have suitable shape configuration adjacent the guide member second end 50 for allowing the user to have a firm grip thereon.

Furthermore, the guide member first end 48 is typically mitered to an angle corresponding to the miter angle 32 such that, when the guide member 46 is inserted in the recess 24, the guide member first end 48 substantially conforms snugly with the shape configuration of the recess mitered end surface 30.

Furthermore, as would be obvious to someone familiar with small hand tools, the measuring jig 10 may be provided with a suitable means for resiliently retaining the guide member 46 within the recess 24 for preventing the latter from inadvertently slipping out therefrom. For example, the contacting surfaces between the recess 24 and the guide member 46 may be at least slightly unpolished or matte for creating a sufficient friction therebetween so that the guide member 46 frictionally engages the body 12 when the guide member 46 is operatively mounted in the recess 24 to retain the guide member 46 in the recess 24. Alternatively, in another example, the guide member side surfaces 58 may be covered with a foam-like film for resiliently exerting a pressure along inner surfaces portions of the recess 24. Other well-known equivalent means in the art of small hand tools are also possible.

Thus, using the guide member 46, the recess 24 of the measuring jig 10 may be user selectively configured to receive, in a snug fit relation, the mitered end of a mitered molding 100 having a predetermined cross-sectional dimension. Accordingly, by inserting the guide member 46 in a user selected pair of guide member engaging grooves 38, the user may selectively vary the lateral dimension of the aperture 26 to suit the transversal dimension of the molding side wall surfaces 106 of a particular mitered molding 100. In other words, the measuring jig 10 of the present invention may, in some embodiments, be user selectively configured to be compatible with a plurality of differently sized mitered moldings 100 of his or her choice. The recess 24 and the at least one guide member 46 are typically suitably configured and sized for receiving different standard sized mitered moldings 100 that are commonly used in carpentry for installation around doors and windows. For example and non-limitingly, a lateral dimension for the aperture 26 may be 2$^{13}/_{16}$ inches (2.8125" or 7.2 cm). The overall width of the body 12, between the body edges walls 16 may be relatively larger that the lateral dimension of the aperture 26, for example about 5 inches (or 12.7 cm) for ease of handling with a single average size hand. The other dimensions of the measuring jig 10 may derive from these dimensions.

The at least one pair of guide member engaging grooves 38 may be suitably positioned along the oppositely facing recess side surfaces 34 such that when a guide member 46 is inserted in a selected pair of guide member engaging grooves 38, the distance between the parallelly extending guide member second edge surface 56 and the recess first edge surface 36 is sufficiently sized for allowing a predetermined size of a mitered molding 100 to be inserted there between in a snug fit relation.

Now referring more particularly to FIGS. 9A and 9B, the body 12 further includes at least one a tape measure mount 40 for mounting at least part of the tape measure 120 thereto so that the tape measure first end 128 is substantially in register with the recess first edge surface 36 adjacent the recess mitered end surface 30. The tape measure mount 40 is for example provided along one or more outer circumference surface portions of the body 12 that coincide with a measurement origin transversal axis 42. The measurement origin transversal axis 42 extends transversally relative to the body 12 so as to coincide with the recess inner end corner 39, as best illustrated in FIG. 2.

In some embodiments, as exemplified in the drawings, the tape measure mount 40 may be represented by an angular recess extending inwardly in a surface portion of the body side wall 14 that extends laterally outwardly between the recess first edge surface 36 and its adjacent body edge wall 16 to form an engaging ledge 45 therein. The engaging ledge extending substantially perpendicularly to the recess side surfaces 34 and substantially perpendicularly to the recess first edge surfaces 36.

The engaging ledge 45 extends longitudinally in register with the measurement origin transversal axis 42 a sufficient length for allowing insertion therein of the width of an average size metal lip 130 of a measuring tape anchoring member 124, as illustrated in FIG. 9B.

Thus, the lateral offset position of the tape measure mount 40 relative to the recess inner end corner 39, in the case where the body 12 is made of a transparent or translucent material, advantageously allows a user to visually confirm in a simultaneous operation that the molding mitered end surface 108 is firmly abutting against the recess mitered end surface 30 and that the measuring tape anchoring member 124 positively coincide with the molding inner end corner 114 for a proper measurement of the molding inner longitudinal edge 104 of the mitered molding 100.

In some embodiments, other equivalent forms of a tape measure mount 40 are also possible. For example, the tape measure mount 40 may be represented by a suitably sized transversal groove or protruding ridge (not shown in the drawings) that extends along one or more than one surface portion of the body 12 that are in register with the measurement origin transversal axis 42. In some other embodiments, the groove or ridge may extend around the whole transversal circumference of the body 12, and in register with the measurement origin transversal axis 42.

The body 12 and the at least one guide member 46 are each typically made of a suitably rigid and lightweight material or materials, such as, for example, plastic, PVC, ABS, Nylon®, Teflon®, a fiberglass reinforced resin, aluminum, a suitable metal alloy, or a combination thereof.

The body 12 and the at least one guide member 46 may each be represented by a single piece element made of plastic using any suitable process known in the art of manufacturing a product made of such a polymeric material including, but not limited to, an injection molding process, a three-dimensional printing process, a machining process, or a combination thereof.

Furthermore, the body 12 and the at least one guide member 46 may each be made of an opaque, a translucent, a transparent material, or a suitable combination thereof. In some embodiments, the body 12 is made of a transparent material such that the molding mitered end surface 108 of a mitered molding 100 inserted into the recess 24 may be advantageously visible to the user. In other embodiments, at least part of the body 12 in register with one of the recess side surfaces 34 is substantially translucent or substantially transparent. Indeed, as would be obvious to someone familiar with modern injection molding and three-dimensional printing processes, the body 12 may be represented by a single piece element partially composed of an opaque material and partially composed of a transparent or translucent polymeric material. Alternatively, the body 12 and the at least one guide member 46 may each represent an assembly of components.

In some embodiments of the body 12', as illustrated in FIG. 11, a window 60 may lead into the recess 24. The window 60 is delimited at least in part by one of the recess side surfaces 34'. To that effect, the window extends transversally through at least one, but typically through both body side walls 14', and substantially proximal the recess mitered end surface 30.

The window 60 is typically suitably positioned and sized for allowing a user to see the whole contacting surfaces between the recess mitered end surface 30 and the molding mitered end surface 108 of a mitered molding 100 inserted in the recess 24 of the measuring jig 10'. The window 60 may be advantageous for a body 12 made entirely of an opaque material.

Referring to FIG. 1, the body 12 may further define a storage aperture 62 extending therethrough provided for example proximally centrally the body rear end 18, for allowing a user to conveniently anchor the measuring jig 10, for example, on hook or nail on a wall for stowaway purposes.

A method of usage of the measuring jig 10 will now be described. In a first step, the method includes selecting a mitered molding 100 having a cross-section that is suitably sized for insertion in a snug fit relation into the recess 24.

In a second step, the method includes inserting the molding mitered end surface 108 of the selected mitered molding 100 longitudinally into the recess 24 so as to have the molding inner longitudinal edge 104 extending along the recess first edge surface 36 so as to have the molding inner end corner 114 firmly abutting into the recess inner end corner 39.

In a third step, the method includes engaging the measuring tape anchoring member 124 into the tape measure mount 40 and extending the measuring tape 122 of the tape measure 120 longitudinally along the length of the molding inner longitudinal edge 104 for measuring and marking a desired length thereof in a conventional manner.

Optionally, before the first step above, the method includes inserting a guide member 46 into a user selected one of the at least one pair of guide member engaging grooves 38 such that the recess 24 is suitably sized for receiving in a snug fit relation a user selected size of mitered molding 100 having a cross-section that is relatively smaller than that of the aperture 26.

It is to be noted that, once the measuring jig 10 is engaged in a snug fit relation on an end portion of a mitered molding 100, the user has both hands free to manipulate the mitered molding 100 and the tape measure 120 in a secure manner.

FIG. 12 illustrates an alternate embodiment of a measuring jig 70, according to the present invention. In this embodiment, the width adjustment element includes a biasing element 72 for biasing the mitered molding 100 towards the recess first edge surface 36. To that effect, the guide member 46 and guide member engaging grooves 38 of the previously described embodiment are replaced with a biasing element 72, including for example at least one leaf spring 76 mounted at the recess second edge surface 37 and protruding in the recess 24. Typically, the biasing element 72 includes many leaf springs 76 provided at longitudinally spaced apart locations along the recess 24.

The leaf springs 76 are suitably sized and shaped for exerting a sufficient force along the molding outer longitudinal edge 102 of a mitered molding 100 inserted in the recess 24, towards the recess first edge surface 36, so as to have the molding inner longitudinal edge 104 substantially uniformly parallelly abutting against the recess first edge surface 36.

Furthermore, the leaf springs 76 are suitably configured and sized such that, when in a fully compressed state, each leaf spring 76 is substantially wholly concealed in a suitably sized spring receiving recess 78 extending inwardly into the recess second edge surface 37.

As exemplified in FIG. 12, each one of the leaf springs 76 may be represented by a curved spring member 76 having one end anchored in the spring receiving recess 78 extending centrally longitudinally along the recess second edge surface 37, with the elongated spring receiving recess 78 is relatively transversally narrower than the recess second edge surface 37.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A measuring jig for measuring a mitered molding using a tape measure defining a tape measure first end, said mitered molding defining a molding mitered end surface, said measuring jig comprising:

a body, said body defining a substantially elongated recess delimited by a recess first side surface, a recess first edge surface extending from said recess first side surface, a recess second edge surface extending from said recess first side surface, said recess first and second edge surfaces extending in a substantially laterally opposed and substantially parallel relationship relative to each other, and a recess mitered end surface extending from said recess first side surface and between said recess first and second edge surfaces, said recess mitered end surface being mitered relative to said recess first and second edge surfaces, said body further defining a tape measure mount for mounting at least part of said tape measure thereto so that said tape measure first end is substantially in register with said recess first edge surface adjacent said recess mitered end surface;

whereby inserting said mitered molding in said recess with said molding mitered end surface abutting against said recess mitered end surface allows measuring said mitered molding using said tape measure.

2. The measuring jig as defined in claim 1, wherein said recess is further delimited by a recess second side surface extending in a substantially parallel and substantially spaced apart relationship relative to said recess first side surface, said recess first edge, second edge and mitered end surfaces extending each between said recess first and second side surfaces, said body further defining an aperture leading in said recess substantially opposed to said recess mitered end surface.

3. The measuring jig as defined in claim 2, wherein said recess first edge surface is shorter than said recess second edge surface.

4. The measuring jig as defined in claim 2, wherein at least part of said body in register with one of said recess first and second side surfaces is substantially translucent.

5. The measuring jig as defined in claim 2, wherein at least part of said body in register with one of said recess first and second side surfaces is substantially transparent.

6. The measuring jig as defined in claim 2, wherein said body is provided with a window leading into said recess and delimited at least in part by one of said recess first and second side surfaces.

7. The measuring jig as defined in claim 2, further comprising a width adjustment element for selectively obstructing part of said recess so that said mitered molding is confined between said width adjustment element and said recess first edge surface when operatively inserted in said recess.

8. The measuring jig as defined in claim 7, wherein said width adjustment element is removably insertable in said recess.

9. The measuring jig as defined in claim 8, wherein said width adjustment element frictionally engages said body when said width adjustment element is operatively mounted in said recess to retain said width adjustment element in said recess.

10. The measuring jig as defined in claim 8, wherein said width adjustment element is longitudinally protruding from said recess when said width adjustment element is operatively mounted in said recess and abuts against said recess mitered end surface.

11. The measuring jig as defined in claim 7, wherein said width adjustment element defines a pair of substantially opposed width adjustment element first and second side surfaces and substantially opposed width adjustment element first and second edge surfaces extending therebetween, said width adjustment element first and second side surfaces respectively abutting against said recess first and second side surfaces when said width adjustment element is operatively inserted in said recess.

12. The measuring jig as defined in claim 7, wherein said recess first and second side surfaces define each a respective groove extending thereinto substantially longitudinally therealong laterally spaced apart from said recess first and second side surfaces, said grooves facing each other, said width adjustment element engaging both of said grooves when said width adjustment element is operatively mounted in said recess.

13. The measuring jig as defined in claim 7, wherein
said width adjustment element defines a pair of substantially opposed width adjustment element first and second side surfaces, said width adjustment element first and second side surfaces facing respectively said recess first and second side surfaces when said width adjustment element is operatively inserted in said recess;
said width adjustment element defines a flange protruding from each of said width adjustment element first and second side surfaces and extending substantially longitudinally along said width adjustment element; and
said flanges are each inserted in a respective one of said grooves when said width adjustment element is operatively mounted in said recess.

14. The measuring jig as defined in claim 7, wherein said width adjustment element includes a biasing element for biasing said mitered molding towards said recess first edge surface when said mitered molding is operatively inserted in said recess.

15. The measuring jig as defined in claim 14, wherein said biasing element includes a leaf spring mounted at said recess second edge surface and protruding in said recess.

16. The measuring jig as defined in claim 15, wherein said recess second edge surface defines a spring receiving recess for receiving said leaf spring therein when said leaf spring is compressed against said recess second edge surface.

17. The measuring jig as defined in claim 1, wherein said tape measure mount defines a ledge extending substantially perpendicularly to said recess first side surface and substantially perpendicularly to said recess first edge surface.

18. The measuring jig as defined in claim 1, wherein said body defines a storage aperture extending therethrough.

* * * * *